US007899888B2

(12) United States Patent
Drake et al.

(10) Patent No.: US 7,899,888 B2
(45) Date of Patent: Mar. 1, 2011

(54) RUNTIME VERSIONING OF INFORMATION PROCESSING SYSTEMS

(75) Inventors: William Trey Drake, Austin, TX (US); Kent Arthur Spaulding, Austin, TX (US); David Gregory Gadbois, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 2849 days.

(21) Appl. No.: 10/184,216

(22) Filed: Jun. 28, 2002

(65) Prior Publication Data

US 2004/0002960 A1 Jan. 1, 2004

(51) Int. Cl.
*G06F 15/16* (2006.01)
(52) U.S. Cl. ...................... 709/220; 709/227
(58) Field of Classification Search ................. None
See application file for complete search history.

(56) References Cited

U.S. PATENT DOCUMENTS

| | | | | |
|---|---|---|---|---|
| 5,920,725 | A * | 7/1999 | Ma et al. | 717/171 |
| 6,269,473 | B1 * | 7/2001 | Freed et al. | 717/104 |
| 6,347,312 | B1 * | 2/2002 | Byrne et al. | 707/3 |
| 6,446,077 | B2 * | 9/2002 | Straube et al. | 707/100 |
| 6,622,170 | B1 * | 9/2003 | Harrison et al. | 709/221 |
| 2003/0105654 | A1 * | 6/2003 | MacLeod et al. | 709/201 |
| 2003/0140339 | A1 * | 7/2003 | Shirley et al. | 717/171 |
| 2003/0204517 | A1 * | 10/2003 | Skinner et al. | 707/100 |
| 2004/0213409 | A1 * | 10/2004 | Murto et al. | 380/258 |

OTHER PUBLICATIONS

Glenn L. Vanderburg et al., Tricks of the Java Programming Gurus, Chapter 17: Network-Extensible Applications with Factory Objects, Sams.net Publishing, 1996, 25 pages.*
Geoffrey A. Pascoe, Object-Oriented Languages: Elements of Object-Oriented Programming, BTYE, Aug. 1986, 139-144.*
Vanderburg, G. L., et al., Tricks of the Java Programming Gurus, Table of Contents and Introduction, 13 pp., downloaded from http://docs.rinet.ru/JaTricks/index.htm Dec. 8, 2005.
Vanderburg, G. L., et al., Tricks of the Java Programming Gurus, Chapter 17, "Network-Extensible Applications with Factory Objects," 12 pp., downloaded from http://docs.rinet.ru/JaTricks/ch17.htm Dec. 8, 2005.

* cited by examiner

*Primary Examiner*—Patrice L Winder
(74) *Attorney, Agent, or Firm*—Brooks Kushman P.C.

(57) ABSTRACT

An information processing system includes a runtime versioning facility which allows for managing its configuration so that modifications made during runtime are propagated and take affect without restarting the system or a portion thereof. This allows the potential for 100% uptime while upgrading such systems. This also provides a system capability to process multiple configuration versions, and to be able to process such versions even while such versions are changing during operation of the information processing systems. For example, a system such as a registry server capable of transactional configuration changes is provided which manages its configuration so that modifications made during runtime are propagated and take affect without restarting the server.

13 Claims, 4 Drawing Sheets

RUNTIME VERSIONING OF INFORMATION PROCESSING SYSTEMS

BACKGROUND

1. Field

The present invention relates to information processing systems, and, more particularly, to runtime versioning in the context of such systems (e.g., dynamic modification of an information processing system without taking the overall system off-line).

2. Description of the Related Art

Many information processing systems operate according to software configurations which migrate through a series of upgrades and/or patches to repair, extend or otherwise modify the capabilities of such systems. In order to effect such modifications, the information processing systems are typically taken off-line, with the consequential detrimental effect on system availability and overall performance. Also, these systems typically need to be backwards compatible with prior versions through successive version updates.

Thus, there is a need for an information processing system with a facility for managing its configuration so that modifications made during runtime are propagated and take affect without restarting the system or a portion thereof. This would allow the potential for 100% uptime while upgrading such systems. There is also a need for a means of allowing an information processing system to be able to process multiple configuration versions, and to be able to process such versions even while such versions are changing during operation of the information processing systems.

BRIEF DESCRIPTION

The present invention relates to information processing systems, and, more particularly, to runtime versioning in the context of such systems (e.g., dynamic modification and extension of an information processing system without taking the overall system offline). For example, a system such as a registry server capable of transactional configuration changes is provided which manages its configuration so that modifications made during runtime are propagated and take affect without restarting the server.

In one embodiment, a service implementation comprises at least one persistent data store, a configuration manager and a request handling interface. The configuration manager is asynchronously updated in correspondence with changes to the at least one persistent data store. The request handling interface employs a factory to instantiate a handler instance for handling of a particular request. The handler instance is instantiated based on then current factory-specific configuration information of the configuration manager.

In another embodiment, a method is provided including the steps of receiving a message at a message processing service, determining if the message is a create object message, and determining if message is a runtime configuration callback message. In a further embodiment, an object is created by a factory responsive to receiving the message if the message is a create object message. In a further embodiment, a factory-specific configuration cache is updated responsive to receiving the message if the message is a runtime configuration callback message. In a further embodiment, a configuration manager is updated if the message is a configuration storage update complete message. In a further embodiment, a persistent data storage is updated if the message is a configuration storage update message.

In another embodiment, a method of implementing runtime versioning is provided. Information stored in a data storage device is changed. Factory-specific configuration information of a configuration manager is updated responsive to the changing of the information stored in the data storage device. A current version of factory-specific configuration information of the configuration manager is accessed by a factory responsive to receiving a message for processing by the factory.

The foregoing provides a brief description, or summary, of certain embodiments discussed in greater detail in the detailed description below. Consequently, the foregoing contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
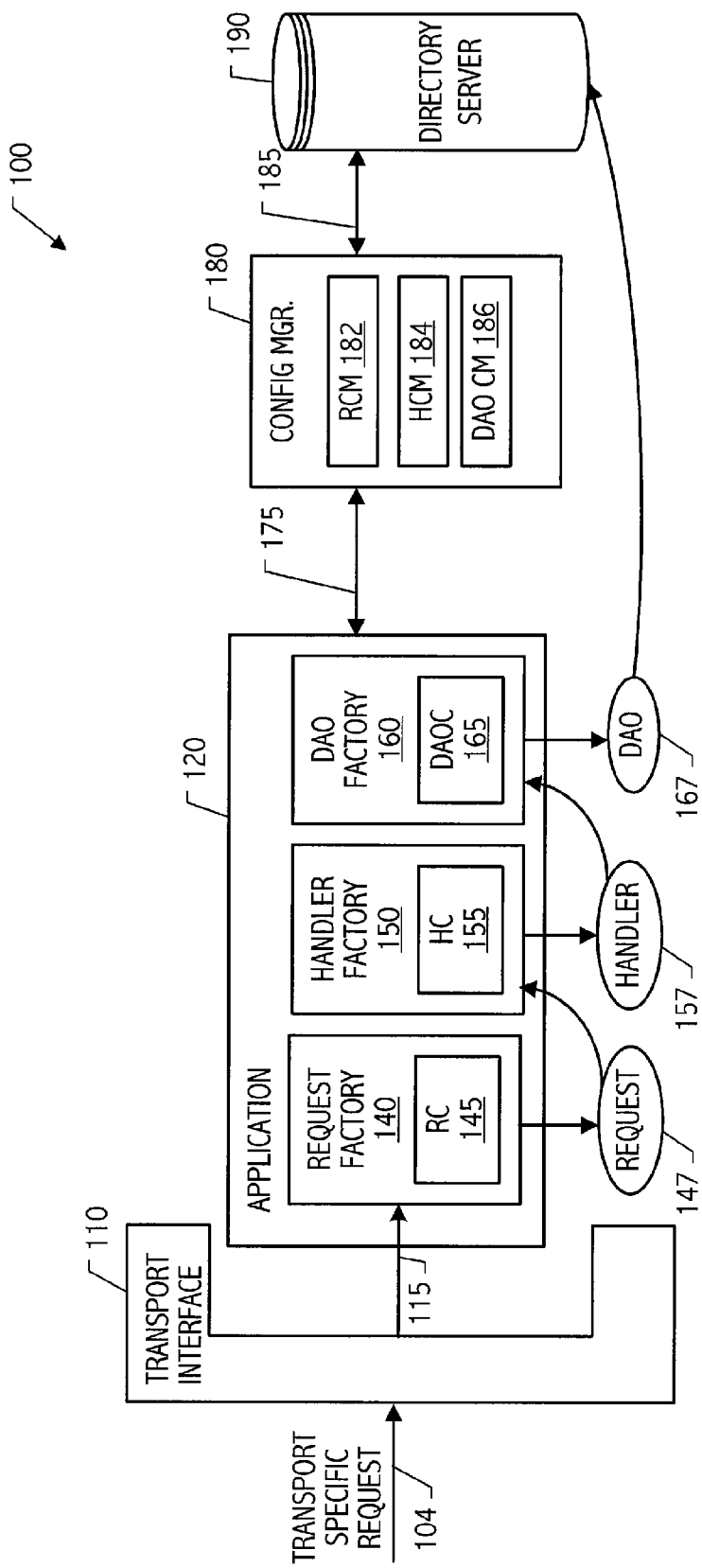
FIG. 1 is a block diagram of one embodiment of an information processing system/network configurable for runtime versioning in accordance with the invention.

FIG. 1 is a block diagram of one embodiment of an information processing system/network 100. System 100 may be any appropriate type of information processing system. In the presently discussed example, system 100 provides a registry server such as a Sun ONE registry server.

System 100 includes transport interface 110, application 120, configuration manager 180 and directory server 190. Transport interface 110 is coupled to receive transport specific request messages via coupling 104, and to provide corresponding messages via coupling 115 to a message processing service such as application 120. Application 120 is coupled to interact with configuration manager 180 and directory server 190 to process the received requests. Application 120 provides a request handling service in the present embodiment. Configuration manager 180 is also coupled to interact with directory server 190.

Transport interface 110 is any type of appropriate interface configured to screen and transfer messages between other information processing systems and system 100. For example, transport interface 110 may provide a Hypertext Transfer Protocol (HTTP) interface or a Java Messaging Service (JMS) interface. In one embodiment, transport interface 110 is configured to receive messages in a non-native format such as the Extensible Markup Language (XML).

Application 120 is a network system application program interface which includes various configuration manager clients or listeners. One type of configuration manager client is a factory singleton for creating process instances to facilitate processing of messages. For example, application 120 includes the illustrated request factory 140, handler factory 150 and a storage access object factory such as Data Access Object (DAO) factory 160.

Each factory includes a configuration cache to enable the factory to operate according to the latest and/or multiple configurations or versions. For example, the configuration cache for each of factories 140, 150 and 160 is illustrated by request configuration (RC) 145, handler configuration (HC) 155 and DAO configuration (DAOC). 165, respectively. In the embodiment shown, request factory 140 uses RC 145 to create request object 147, handler factory 150 uses HC 155 to create handler object 157, and DAO factory 160 uses the DAOC 165 to create DAO 167. As used herein, a client or factory configuration cache need not be, and in this embodiment is not, a dedicated hardware cache, and may take as simple a form as software partitioned areas of memory assigned to the respective factories.

Configuration manager 180 is a software object which includes a configuration manager for each client in application 120. Specifically, as shown, configuration manager 180 includes request configuration manager (RCM) 182, handler configuration manager (HCM) 184 and DAO configuration manager (DAO CM) 186. Configuration caches 145, 155, and 165 interact with configuration managers 182, 184, and 186, respectively, to ensure proper runtime versioning. Configuration managers 182, 184 and 186 are updated responsive to changes to directory server 190.

Directory server 190 is a file system on any appropriate form of persistent data storage. Directory server 190 may include a number of data storage devices coupled together. In a registry server embodiment, registry server information and configuration may be stored within directory server 190. In one embodiment, directory server 190 is a Lightweight Directory Access Protocol (LDAP) directory server. In another embodiment, directory server 190 is a Sun ONE directory server. In still another embodiment, directory server 190 is a relational database management system (RDBMS).

During operation the various components of system 100 communicate via a variety of messages including update messages, object creation messages, callback messages and search messages. For example, request factory 140 receives non-native format messages from transport interface 110 and generates request objects such as request 147. Request 147 may be a java object request such as an administrative request. Request 147 may be a Universal Description, Discovery and Integration (UDDI) request. Request 147 sends a native format request message to handler factory 150. Handler factory 150 generates a handler object such as handler 157 responsive to request 147. Handler 157 includes information from request 147. Handler 157 uses DAO 167 to access directory server 190. DAO 167 is created by DAO factory 167 responsive to handler 157. In each case, the factory consults the respective configuration factory for the appropriately versioned configuration information for use in creating the respective object.

If a configuration update message is received at a component of system 100, an update to configuration information stored at directory server 190 is made. Configuration manager 180 detects the update via a persistent search message to directory server 190. Responsive to detecting the update at directory server 190, configuration manager 180 updates its own respective client-specific caches (e.g., CMs 182, 184 and 186) as appropriate, and informs the appropriate clients (e.g., factories 140, 150 and 160) via callback messages.

Figure 2:
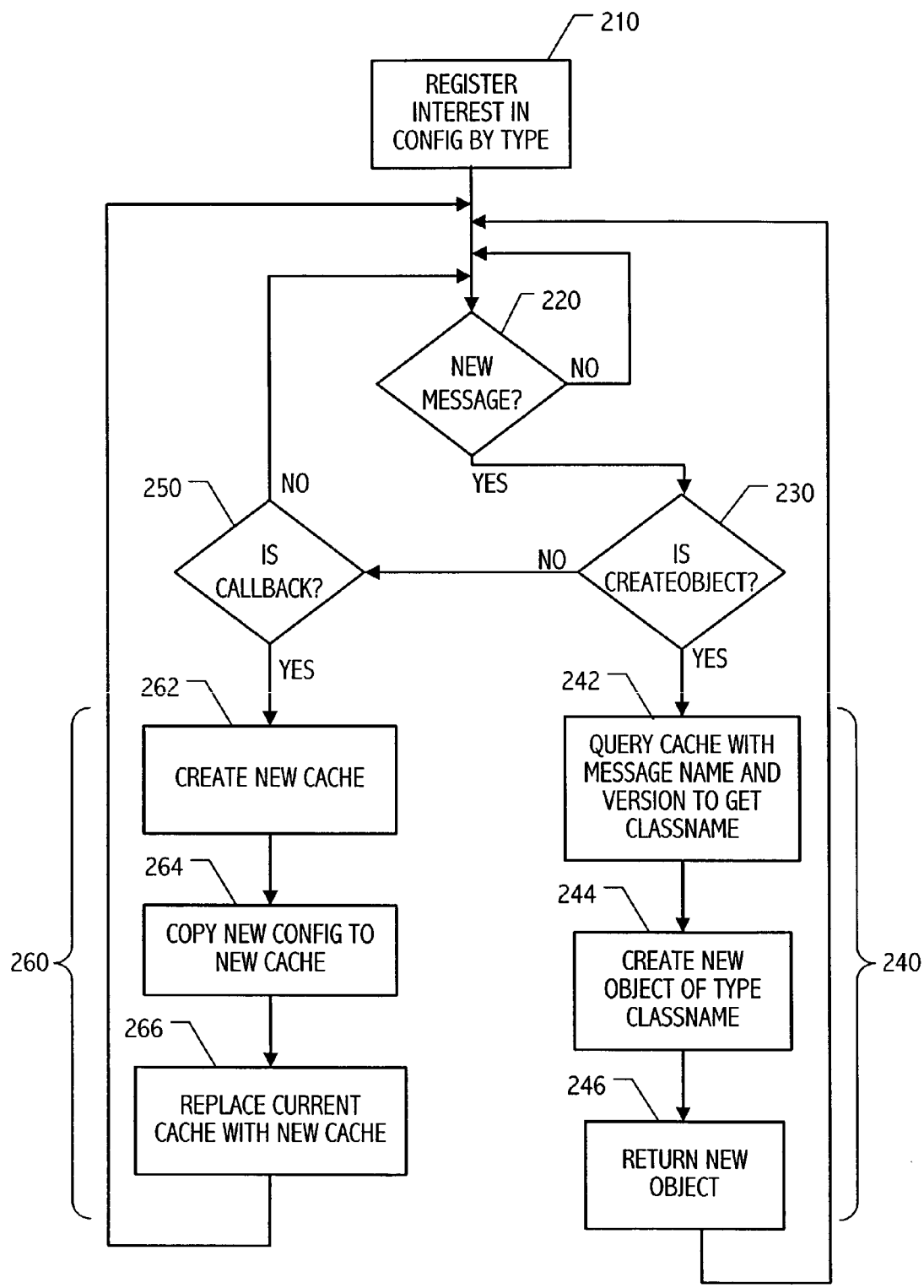
FIG. 2 is a flowchart showing an exemplary flow of operation for a configuration manager client within the system of FIG. 1.

FIG. 2 is a flowchart showing an exemplary flow of operation for a configuration manager client within the system of FIG. 1. As discussed above, exemplary configuration manager clients include request factory 140, handler factory 150 and DAO factory 160. During registration operation 210, each configuration manager client registers its interest in configuration information stored in configuration manager 180. For example, request factory 140 registers interest in updated configuration information so that when the request configuration manager 182 is updated, request configuration cache 145 may be updated by a callback procedure. Other factories may make similar registrations for their respective configuration caches.

After registration operation 210, the configuration manager client waits for new messages. If a new message is received during new message decision 220 control transitions to create object decision 230. If the message requires creation of an object, such object is created during object creation flow 240. If the message does not require creation of an object, the configuration manager client in question determines if the messages is a callback message during decision 250. If the message is not a callback message, the configuration manager client again waits for new messages. If the message is a callback message, the callback is processed during configuration caching flow 260.

In the illustrated embodiment, if the message requires creation of an object, the configuration cache is queried during cache query operation 242. The configuration cache of the configuration manager client is queried with the message name and version to get the appropriate class name. After the appropriate class name is obtained during query operation 242, a new object of the appropriate class name type is created during create object operation 244. After the new object is created during creation object operation 244, the new object is returned during return operation 246. The configuration manager client then waits for new messages again (e.g., at decision 220).

For example, responsive to a message being received by request factory 140, request factory 140 queries the request factory configuration cache 145 with the message name and version of the message. Configuration cache 145 provides the necessary information to create request 147. The message may be compatible with one of several protocol versions understood by application 120, and configuration cache 145 provides the appropriate information for the version of the message to create the appropriately versioned request object.

For further example, responsive to receiving a native format request message from request object 147, handler factory 140 queries the handler factory configuration cache 155 with the name and version of the request. Configuration cache 155 provides the necessary information to create handler 157. The native format message may be compatible with one of several protocol versions understood by application 120, and configuration cache 155 provides the appropriate information for that version to create the appropriately versioned handler object 157. Similar operations may occur with regard to DAO factory 160 and DAO object 167.

If the message is determined to be a callback message during decision 250 shown in FIG. 2, the configuration management client must take certain steps to update its configuration cache. This may be performed to obtain the latest version information, for example. In the illustrated embodiment, a new configuration cache is created during cache creation operation 262. After a new cache is created during cache creation operation 262, new configuration information is copied to the newly created configuration cache during cache copy operation 264. After cache copy operation 264, the current configuration cache is replaced atomically with the newly created configuration cache during cache replacement operation 266. The configuration manager client then waits for new messages again (e.g., at decision 220).

For example, responsive to a callback message being received by request factory 140, request factory 140 creates a new request factory configuration cache. Request factory 140 then copies new configuration information from request configuration manager 182 to the newly created configuration cache. Next, request factory 140 replaces configuration cache 145 with the new configuration cache which contains the latest configuration information. Similarly, handler and DAO factory configuration caches 155 and 165 may be updated from handler and DAO configuration managers 184 and 186, respectively.

Figure 3:
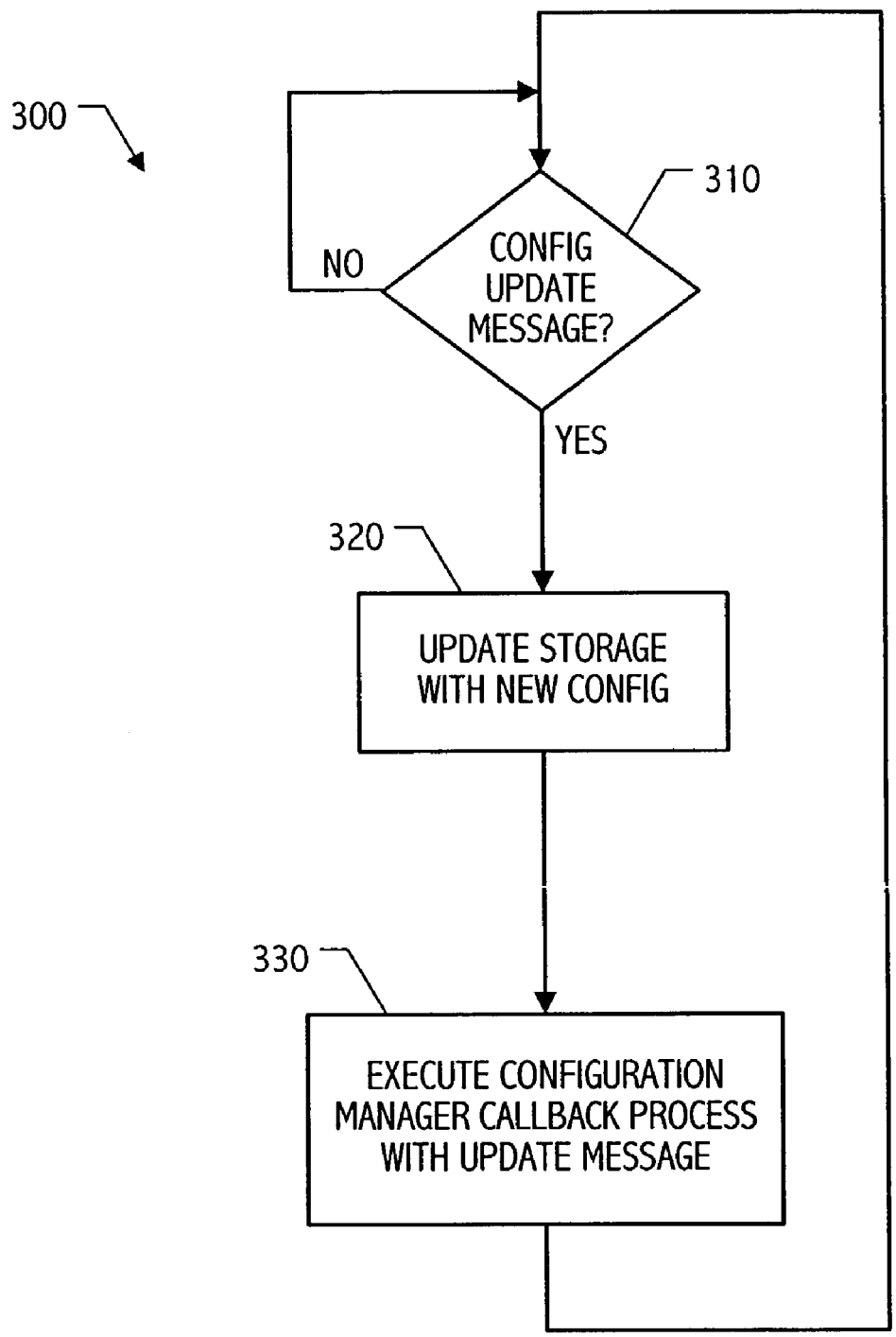
FIG. 3 is a flowchart showing an exemplary operational flow of a logical persistent search process executing within the system of FIG. 1.

FIG. 3 is a flowchart showing an exemplary operational flow of a logical persistent search process executing within the system of FIG. 1. The logical persistent search process is used to update directory server 190 with information intended to change the configuration information used to generate objects by configuration manager clients. In one embodiment, system 100 provides a registry server configuration class which uses an LDAP persistent search for asynchronous notification of configuration changes within the directory of directory server 190. From a programming perspective, a persistent search works like a synchronous, LDAP search, but calls iterate over the search result block until there is a result available, hence a separate thread is used for this function.

Referring to FIG. 3, after a configuration update message is received at system 100 during update message decision 310, a storage element of system 100 (e.g., a portion of directory server 190) is updated with new configuration information from the message during update operation 320. After the persistent data storage is updated during operation 320, an update message is sent from directory server 190 to configuration manager 180 if the update corresponds to a search result. A configuration manager callback process (e.g., process 400 of FIG. 4) is initiated responsive to receiving the update message/search result. The configuration manager call back process updates configuration manager 180 from directory server 190 in accordance with the changes indicated in the update message.

Because configuration manager 180 is only interested in registry server configuration information, an LDAP search filter is used to restrict the search to the entries of an objectclass type matching the allowed configuration manager client types, some of which are shown in FIG. 1. The search is set to wait for adds or modifies. Using this method, a result is returned to the search thread upon an add or modify operation to a configuration entry in directory server 190.

Figure 4:
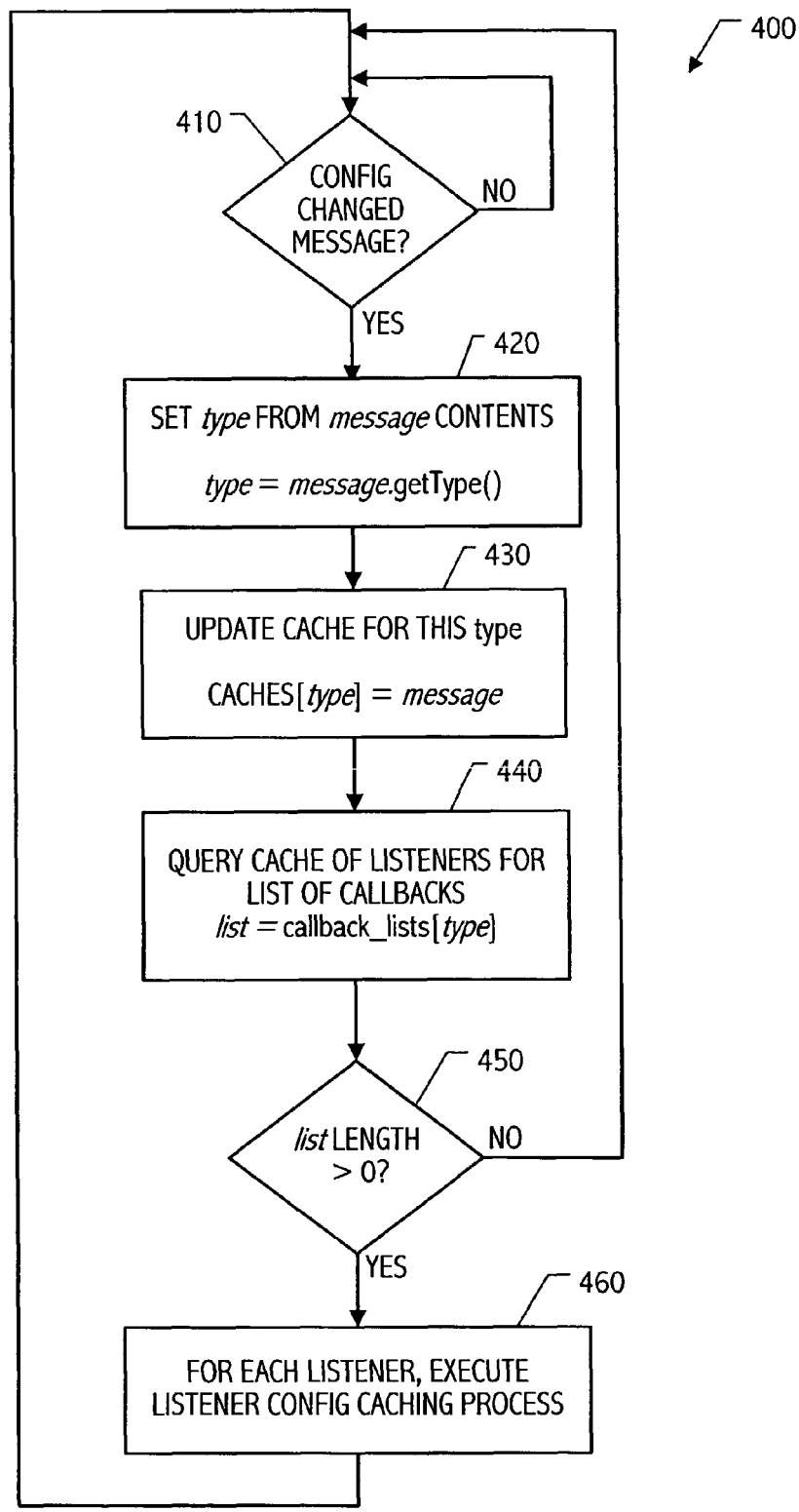
FIG. 4 is a flowchart showing an exemplary operational flow of a configuration management callback process executing within the system of FIG. 1.

FIG. 4 shows one example of the configuration management callback process referenced above with regard to FIG. 3. As shown in FIG. 4, configuration manager 180 waits for an update message indicating that the configuration information stored in directory server 190 has been changed. If such an update message is received during change message decision 410, the type of configuration information change is determined from the update message during get type operation 420. For example, the type may be representative of one or more of the factories, but is at least indicative of which portions of configuration manager 180 should be updated. After the type of configuration information change is determined during operation 420, the appropriate sub-configuration manager cache (e.g., one or more of CMs 182, 184 and 186) within configuration manager 180 is updated during update operation 430. After update operation 430, the sub-configuration manager caches are queried to retrieve a list of callbacks during list query operation 440. Each sub-configuration manager cache indicates a callback if registration was made during operation 210 (FIG. 1). Next, if the callback list does not include any listener callbacks during list decision 450, then operation continues with additional change messages at operation 410. If the callback list length is not zero during list decision 450, the listener configuration caching process is performed for each listener. For example, callback messages may be used for each configuration manager client to initiate the configuration caching flow 260 shown in FIG. 1 for each client.

Using configuration manager 180 in this way allows other components in the system to receive notification of changes to one or more configuration components. For example, the handling component requests updates about changes to the handling configuration entry. When the configuration component receives a search result indicating that the handling configuration entry, it notifies the handling component by sending it, via a callback, the new configuration.

To facilitate this notification, each configuration entry is self-describing. Each has an attribute that identifies it as a particular configuration entry, e.g., Handler or DAO. When the persistent search thread receives an entry that has changed, it evaluates this attribute and caches the entry contents in memory. Finally, it notifies registered components of the registry server about these changes via their callbacks.

System 100 provides the capability for administrators to manipulate registry server functionality at runtime. The set of registry server protocol handlers together form what is known as the application/registry server. Through the configuration manager protocol, handlers and other functionality may be swapped, for example, with an alternate implementation and/ or removed without requiring a server restart. This function allows the ability for system administrators to add new protocol functions in the future and deprecate old ones with zero application downtime.

Each configuration runtime contains a single set of factories that manage the set of exported registry protocol function (e.g., UDDI and administrative API). Factories retrieve the list of support functions from the configuration manager on start-up. As discussed above, a callback between each factory and the configuration manager ensures subsequent updates to the list are propagated as needed.

In one embodiment, redundant registry servers are deployed to enhance performance and/or reliability. Therefore, a configuration management runtime (e.g., configuration manager 180) may be embedded within each of the registry servers. Additional, replicated directory servers may also be added to further increase reliability. Each registry server is then coupled to one or more directory servers such as directory server 190. When clustered, a single management runtime receives the modification request over HTTP/SOAP. For example, a system user or administrator may send a modification message to one of the registry servers. The runtime configuration manager at the registry server receiving the message then stores the change within a directory server, but does not typically communicate with its peer registry servers. Upon a successful update of the directory server, the directory server propagates the change to all active registry server instances. These instances are then responsible for updating their configuration caches. Thus, an update message arrives from a user where it is implemented at the receiving registry server, then the update is stored in a directory server coupled to the registry server, and then it is updated from the directory server to each registry server.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

For example, those skilled in the art will recognize that boundaries between the functionality of the above described operations are merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

The operations discussed herein may consist of steps carried out by system users, hardware modules and/or software modules. In other embodiments, the operations of FIGS. 2-4, for example, are directly or indirectly representative of software modules (e.g., factories, objects, routines, or other partitional software designations) resident on a computer readable medium and/or resident within a computer system and/or transmitted to the computer system as part of a computer program product. Thus, the operations referred to herein may correspond to modules or portions of modules (e.g., software firmware or hardware modules, or combinations thereof). The functionality of operations referred to herein may correspond to the functionality of modules or portions of modules in various embodiments. Accordingly, the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

The above described method, the operations thereof and modules therefor may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system. A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method(s) described above may be embodied in a computer-readable medium for configuring a computer system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; spintronic memories, volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

It is to be understood that the architecture(s) depicted herein (e.g., in FIG. 1) are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A service implementation comprising:
   at least one persistent data store;
   a configuration manager comprising a plurality of factory configuration objects and having client-specific caches that are asynchronously updated with configuration information in correspondence with changes to the at least one persistent data store; and
   a request handling interface comprising a plurality of factories and employing a factory to instantiate a handler instance for handling of a particular request, the handler instance being instantiated based on then current factory-specific configuration information of the configuration manager, and each of the factory configuration objects corresponding to at least one of the plurality of factories, being configured for asynchronous update separately from others of the factory configuration objects, and being responsive to an update to the at least one persistent data store.

2. The service implementation of claim 1 configured to initiate a persistent search to accomplish the asynchronous update.

3. The service implementation of claim 2 wherein the persistent search is an LDAP persistent search.

4. The service implementation of claim 1 wherein the configuration manager is configured to notify the factory of the then current factory-specific configuration information via a callback to the factory.

5. The service implementation of claim 1 wherein the plurality of factories comprises a request factory coupled to receive mark-up language requests and to instantiate a UDDI request messages responsive thereto.

6. The service implementation of claim 5 wherein the plurality of factories further comprises a handler factory coupled to instantiate handler objects used to process UDDI messages.

7. The service implementation of claim 6 wherein the plurality of factories further comprises a store access factory configured to instantiate store access objects responsive to the handler objects.

8. The service implementation of claim 7 wherein the store access objects are data access objects (DAO).

9. The service implementation of claim 7 wherein the configuration manager comprises:
   a request factory configuration object;
   a handler factory configuration object; and
   a store access factory configuration object.

10. The service implementation of claim 9 wherein each factory configuration object is configured for asynchronous update separately from others of the factory configuration objects and responsive to an update to the at least one persistent data store.

11. The service implementation of claim 9 wherein each factory configuration object is configured for asynchronous update without taking the configuration manager offline.

12. The service implementation of claim 1 wherein the persistent data store is an LDAP server.

13. The service implementation of claim 1 wherein the persistent data store is an RDBMS.

* * * * *